(12) United States Patent
Daczko et al.

(10) Patent No.: US 12,555,047 B2
(45) Date of Patent: Feb. 17, 2026

(54) SYSTEMS AND METHODS FOR FORMULATING OR EVALUATING A CONSTRUCTION COMPOSITION

(71) Applicant: CONSTRUCTION RESEARCH & TECHNOLOGY GMBH, Trostberg (DE)

(72) Inventors: Joseph Daczko, Beachwood, OH (US); Hamed Kayello, Shaker Heights, OH (US); Tony Schlagbaum, Beachwood, OH (US); David C. Henson, Beachwood, OH (US); Paul Horst Seiler, Beachwood, OH (US); Jeffrey Bury, Beachwood, OH (US)

(73) Assignee: CONSTRUCTION RESEARCH & TECHNOLOGY GMBH, Trostberg (DE)

( * ) Notice: Subject to any disclaimer, the term of this patent is extended or adjusted under 35 U.S.C. 154(b) by 52 days.

(21) Appl. No.: 17/429,437

(22) PCT Filed: Feb. 11, 2020

(86) PCT No.: PCT/US2020/017616
§ 371 (c)(1),
(2) Date: Aug. 9, 2021

(87) PCT Pub. No.: WO2020/167728
PCT Pub. Date: Aug. 20, 2020

(65) Prior Publication Data
US 2022/0129797 A1    Apr. 28, 2022

Related U.S. Application Data

(60) Provisional application No. 62/803,855, filed on Feb. 11, 2019.

(51) Int. Cl.
*G06Q 10/04* (2023.01)
*G06N 20/00* (2019.01)
*G06Q 10/0631* (2023.01)

(52) U.S. Cl.
CPC ............ *G06Q 10/04* (2013.01); *G06N 20/00* (2019.01); *G06Q 10/06313* (2013.01)

(58) Field of Classification Search
None
See application file for complete search history.

(56) References Cited

U.S. PATENT DOCUMENTS

2007/0192257 A1    8/2007    Amey et al.
2007/0266905 A1*  11/2007   Amey ................... B28C 5/006
                                                                  700/68

(Continued)

FOREIGN PATENT DOCUMENTS

DE    4437970 A1    5/1996
JP    H11-77660 A   3/1999

(Continued)

OTHER PUBLICATIONS

Nunez I, Marani A, Nehdi ML. Mixture Optimization of Recycled Aggregate Concrete Using Hybrid Machine Learning Model. Materials (Basel). Sep. 29, 2020;13(19):4331. doi: 10.3390/ma13194331. (Year: 2020).*

(Continued)

*Primary Examiner* — Chesiree A Walton
(74) *Attorney, Agent, or Firm* — Goodwin Procter LLP

(57) ABSTRACT

Example embodiments provide systems and methods for formulating and evaluating a construction composition (such as a mixture for concrete, asphalt, mortar, etc.). According to exemplary embodiments, a predictive model, artificial intelligence, machine learning algorithm, etc., may be trained using historical performance data and current deployment information. Based on a job specification that identifies various requirements for the construction composition and a set of available inputs (e.g., raw materials, mixing techniques, etc.), the model, AI, or algorithm, may output one or more formulations that meet or best approximate the requirements. The formulations may be provided to a simulation to estimate or predict their performance. The (Continued)

performance characteristics of the output formulation(s) may be displayed. Optionally, the system may control mixing machinery to produce the formulation. Some embodiments may use these capabilities to evaluate an existing or proposed construction composition, rather than proposing a new construction composition.

25 Claims, 11 Drawing Sheets

(56) References Cited

U.S. PATENT DOCUMENTS

| | | | |
|---|---|---|---|
| 2008/0066653 A1* | 3/2008 | Andersen | C04B 28/02 106/713 |
| 2016/0114498 A1* | 4/2016 | Radjy | G06Q 10/0639 700/265 |
| 2018/0341248 A1* | 11/2018 | Mehr | B22F 10/38 |

FOREIGN PATENT DOCUMENTS

| | | | |
|---|---|---|---|
| JP | 4206485 B2 | * | 1/2009 |
| JP | 2018-69487 A | | 5/2018 |
| JP | 2018-179509 A | | 11/2018 |
| JP | 6794039 B2 | * | 12/2020 |

OTHER PUBLICATIONS

International Search Report and Written Opinion for International Patent Application No. PCT/US2020/017616 mailed on May 4, 2020, 16 pages.

Office Action for Japanese Patent Application No. 2021-546758, mailed Feb. 1, 2024.

* cited by examiner

FIG. 3A

| INPUT | FRESH PROPERTIES | | | | | | | | STRENGTH | | | APPEARANCE | ECONOMY | DURABILITY | | | | |
|---|---|---|---|---|---|---|---|---|---|---|---|---|---|---|---|---|---|---|
| | WORKABILITY | WORKABILITY RETENTION | AIR CONTENT | STABILITY | UNIFORMITY | VISCOSITY | FINISHABILITY | SETTING TIME | COMPRESSIVE | FLEXURAL | TENSILE | | | FREEZE/THAW | SCALING | CHEMICAL ATTACK | ABRASION | SHRINKAGE |
| SPECIFIC INFORMATION | | | | | | | | | | | | | | | | | | |
| ACI CODE | X | | | | | | | | | | | | | | | | | |
| ASTM SPECIFICATIONS | | X | | X | X | | | X | | | | | | | | | | |
| PROJECT SPECS | | | | | | | | | X | | | | | | | X | X | |
| ARCHITECTURAL NEEDS | | | X | | | | | | | | | X | | | | | | |
| CONSTRUCTION PROCESSES | | | | | | | | | | | | | | | | | | |
| CONCRETE PRODUCER | | | | | | | X | | X | | | | | | | | | |
| MIXING TECHNIQUES | | | | | X | | | | | | | | | | | | | |
| TRANSPORTATION TECHNIQUES | | | | | | | | | | | | | | | | | | |
| CONCRETE CONTRACTOR | | | | | | | | | | | | | | | | | | |
| PLACEMENT METHODS | | X | | | | X | | | | | | | | | | | | |
| CONSOLIDATION METHODS | | | | | | | | | | | | X | | | | | X | |
| FINISHING METHODS | | | | | | | | | | | | X | | | | | | |
| CURING METHODS | | | | | | | | | | | | | | | | | | |
| AVAILABLE RAW MATERIAL | | | | | | | | | | | | | | | | | | |
| CEMENT CHARACTERISTICS | X | | | | | | | | | | | | | | | | | |
| COARSE AGGREGATE CHARACTERISTICS | X | | | | X | X | X | | | | | | | | | | | |
| FINE AGGREGATE CHARACTERISTICS | X | | | | | | | | | | | X | | | | | | |
| SCM CHARACTERISTICS | | | | | | | X | | | | | X | X | X | X | | | |
| AVAILABLE ADMIXTURES | | | | | | | | | | | | | | | | | | |
| DISPERSANT TYPE | | | | | | | | X | | | | | | | | | | |
| AEA TYPE | X | | | | | | | | | | | | | X | X | | | |
| ACCELERATOR | | | | | | | | | | | | | | | | | | |
| RETARDER | | | | | | | | | | | | | | | | | | |
| OTHER | | | | | | | | | | | | | | | | | | |
| OUTSIDE VARIABLES | | | | | | | | | | | | | | | | | | |
| WEATHER | | | | | | | | | | | | | | | | | | |
| RAIN | | | | | | | | | | | | | | | | | | |
| SNOW | | | | | | | | | | | | | | | | | | |
| TEMPERATURE | X | | | X | | | | X | | | | | X | X | X | | | |
| WIND | X | | | | | | | | | | | | | | | | | |
| TRAVEL | | | | | | | | | | | | | | | | | | |
| ROUTE | | | | | | | | | | | | | | | | | | |
| DISTANCE | | X | X | X | | | | X | X | | X | X | X | X | X | | | |
| TRAFFIC | | | | | | | | | | | | | | | | | | |

|  | CONSTRUCTABILITY EASE/EFFORT ||||||| | | |
| --- | --- | --- | --- | --- | --- | --- | --- | --- |
|  | PLACING | SCREEDING | FLOATING | EDGING | FINISHABILITY | USE | CURLING | CRACKING |
| SLUMP | X |  |  |  |  |  |  |  |
| STICKINESS |  |  | X |  |  |  |  |  |
| BLEED |  |  |  |  | X |  |  |  |
| SLUMP LOSS STIFFENING |  | X |  |  |  |  |  |  |
| SETTING |  |  |  |  | X |  |  |  |
| STRENGTH DEVELOPMENT |  |  |  |  |  | X |  |  |
| VOLUME CHANGE |  |  |  |  |  |  |  | X |

FIG. 3B

| | VARIABLE INCREASED | SLUMP | STICKINESS | BLEED | SLUMP LOSS | SETTING TIME | STRENGTH DEV | VOLUME CHANGE |
|---|---|---|---|---|---|---|---|---|
| MIXTURE PROPORTIONING | WATER CONTENT | | X | | | | | |
| | CEMENT FACTOR | | | | | | X | |
| | SCM% | | | | | X | | |
| | w/cm RATIO | | | X | | | | |
| | AIR CONTENT | X | | | | | | |
| RAW MATERIAL CHARACTERISTICS | VARIABLE INCREASED | SLUMP | STICKINESS | BLEED | SLUMP LOSS | SETTING TIME | STRENGTH DEV | VOLUME CHANGE |
| | WATER CONTENT | | X | | | | | |
| | CEMENT FACTOR | | | | | | X | |
| | SCM% | | | | | X | | |
| | w/cm RATIO | | | X | | | | |
| | AIR CONTENT | X | | | | | | |
| AMBIENT CONDITIONS | VARIABLE INCREASED | SLUMP | STICKINESS | BLEED | SLUMP LOSS | SETTING TIME | STRENGTH DEV | VOLUME CHANGE |
| | WATER CONTENT | | X | | | | | |
| | CEMENT FACTOR | | | | | | X | |
| | SCM% | | | | | X | | |
| | w/cm RATIO | | | X | | | | |
| | AIR CONTENT | X | | | | | | |

FIG. 3C

SYSTEMS AND METHODS FOR FORMULATING OR EVALUATING A CONSTRUCTION COMPOSITION

RELATED APPLICATIONS

This application is a national phase filing under 35 U.S.C. § 371 claiming the benefit of and priority to International Patent Application No. PCT/US2020/017616, filed on Feb. 11, 2020, which claims the benefit of U.S. Provisional Patent Application No. 62/803,855, filed on Feb. 11, 2019. The contents of these applications are incorporated herein in their entirety.

FIELD OF THE INVENTION

The present application relates to improvements in the production of construction and engineering compositions such as asphalt, concrete, mortar, and the like.

BACKGROUND

Certain materials used in construction and engineering are compositions of raw materials that are blended together to achieve desired properties. Typically, a construction composition includes a construction mixture made up of construction mixture raw materials. Such a construction mixture may be produced at a plant and includes all the materials of the composition except a construction admixture, which represents a chemical additive used in the production of a combined construction composition. The construction admixture is made up of construction admixture raw materials.

Although a layman may refer to a construction composition in the abstract (e.g. "concrete"), in practice there are many different ways to formulate such a construction composition. For instance, the type and amount of construction mixture and admixture raw materials may be varied, the construction composition raw materials may be mixed using different methods and to differing degrees, more or less water may be used, etc. Different formulations may yield different properties that may be desirable in different contexts.

In one example, a first construction team may require a concrete that sets relatively quickly, whereas a second team may require more time to lay the concrete. The setting time may be varied by using different amounts of water, differing amounts of cement, differing amounts of supplementary cementing materials, differing cement finenesses, etc.

Construction compositions can vary for other reasons, as well. It is often impractical to produce all of the required construction composition for a large job at a single location (e.g., a single concrete plant). Instead, many different plants may contribute to a project, and each plant may ship several batches at different times over the course of the project. Different construction mixture raw materials having different properties (e.g., larger or smaller aggregate sizes) may be available at the different plants, resulting in less consistency between the construction compositions being deployed at the construction site.

Moreover, the ambient conditions at each plant may be different, and may vary over time. The routes from the plants to the construction site may differ in travel time or distance, and different drivers may take different routes from the same plant. The expertise of the work force at each plant may vary. Thus, it can be seen that only some of the conditions affecting the properties of the construction composition are within the control of the producer.

For these and other reasons, the different batches of construction mixtures delivered to a job site may vary greatly. However, it is not acceptable for any of the construction mixtures to fail to meet specified engineering requirements. If a certain minimum compressive or tensile strength is called for, the plants producing the construction mixture cannot choose a combination of raw materials and/or techniques that results in less than the required strength. If they did, the structure being constructed could fail.

Because of these considerations, construction compositions produced today tend to be over-engineered. In other words, various methods of adjusting properties of the construction compositions are chosen so that the resulting construction composition has properties exceeding (sometimes significantly) the engineering requirements of the construction composition. This costs the producer (and, in turn, the contractors, developers, and end-users of the constructed structures) money and time, and unnecessarily wastes raw materials. Industry experts estimate that 80% of concrete mixtures produced today suffer from this problem.

Nonetheless, the goal of a contractor using the construction compositions is to achieve similar inter-batch consistency in terms of the performance of the construction composition, and not necessarily in terms of the raw materials or mixing techniques used. For example, the contractor is likely more concerned that each batch have a consistent setting time, which could be achieved by adjusting the water content of the mixture, by changing the percentage of supplementary cementing materials, or by waiting to deploy the mixture until a desired ambient temperature is achieved. As long as the other properties of the construction composition (e.g., strength, aesthetic qualities, slump, etc.) are not adversely affected, the particular method of achieving the desired setting time is of less concern.

Thus, some variation in the construction composition=raw materials or mixing techniques of each batch can be tolerated, as long as the performance of each batch is consistent and meets the engineering requirements. This creates an opportunity to lower the cost and reduce the amount of construction composition raw materials used to produce such construction compositions. Unfortunately, even the most advanced experts cannot take into account the wide variety of available inputs, rapidly-changing conditions at the plant and the construction site, and other factors that might affect the performance of the construction mixture. Accordingly, these construction compositions continue to be unnecessarily over-engineered.

BRIEF DESCRIPTION OF THE DRAWINGS

FIG. 3A depicts an exemplary mapping of modifiable parameters and sources of requirements to construction composition properties that may be defined by the requirements or affected by adjustments to the parameters.

FIG. 3B depicts a mapping of exemplary desired performance parameters to corresponding properties of a construction composition.

FIG. 3C depicts an exemplary mapping of modifiable variables to construction composition properties affected by a change in the modifiable variables.

SUMMARY OF INVENTION

Figure 1:
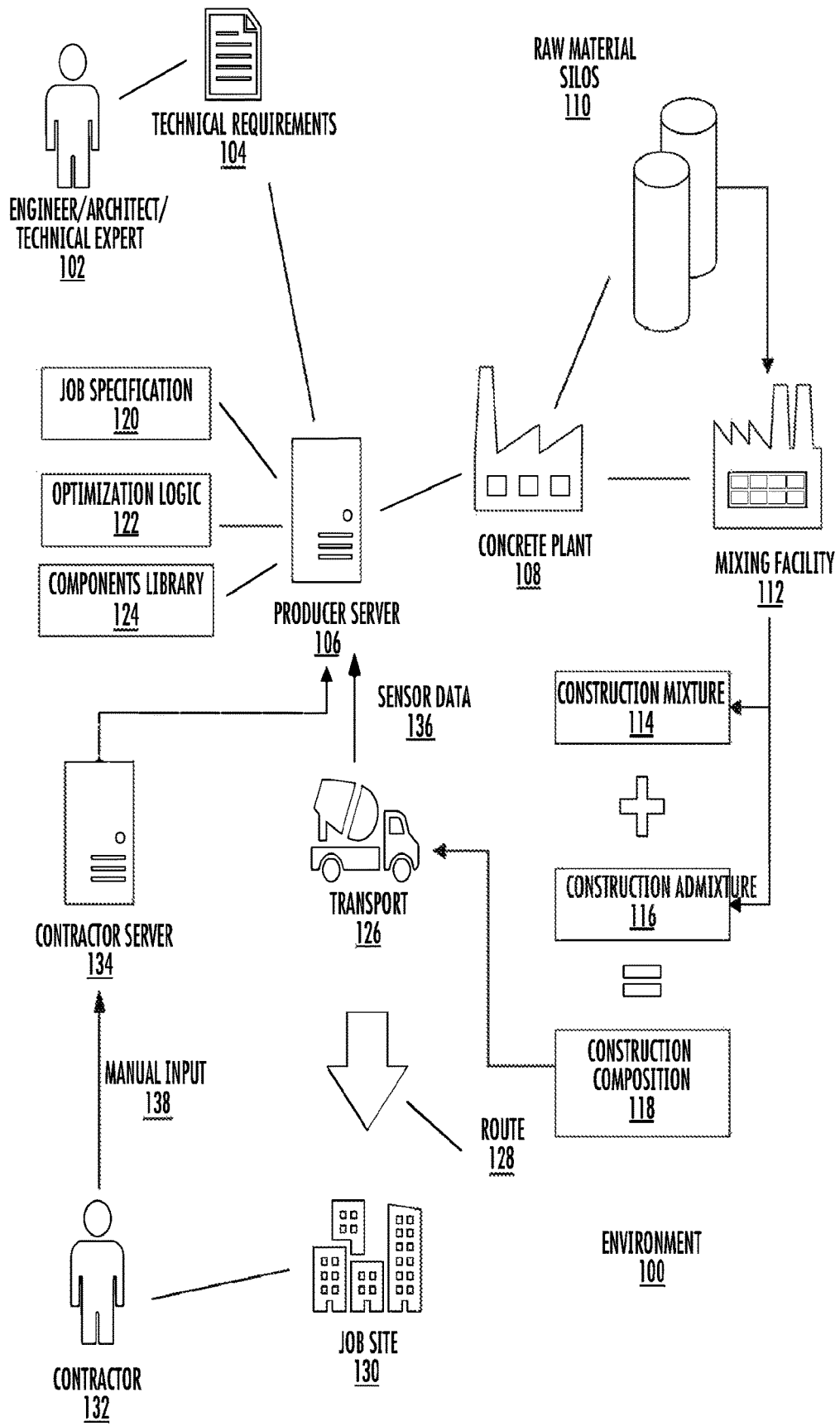
FIG. 1 depicts an environment suitable for use with exemplary embodiments.

The invention includes a non-transitory computer-readable medium storing instructions that, when executed by one or more processors, cause the one or more processors to: receive a job specification for a construction composition, the job specification specifying one or more performance requirements for the construction composition; accessing a set of inputs affecting one or more properties of the construction composition; providing the job specification and set of inputs to a predictive model; programmatically determining, using the predictive model, at least one construction composition that meets or approximates the performance requirements of the job specification given the set of inputs wherein the construction composition comprises a plurality of raw materials mixed in a determined ratio; and outputting the at least one determined construction composition.

The invention further includes any of the described mediums herein further storing instructions for producing the determined construction composition.

The invention further includes any of the described mediums herein wherein the construction composition is selected from the group of an asphalt mixture, a concrete mixture, or a mortar mixture.

The invention further includes any of the described mediums herein wherein the job specification comprises one or more of a fresh property of the construction composition, a hardened property of the construction composition, a strength of the construction composition, a surface appearance of the construction composition, a cost of the construction mixture, or a durability of the construction mixture.

The invention further includes any of the described mediums herein further including receiving a priority for one or more of the performance requirements, and accounting for the priority The invention further includes any of the described mediums herein, wherein the set of inputs comprise one or more of available raw materials, climatological data for a construction site, construction processes to be employed with the construction composition, project specification information, available construction admixtures, and information pertaining to travel from a mixing site to a construction site.

The invention further includes any of the described mediums herein, further storing instructions for: outputting a plurality of construction compositions approximating the performance requirements of the job specification; running a simulation on each of the plurality of compositions to predict an expected performance of each respective construction composition; and outputting the expected performance of each respective construction composition.

The invention further includes any of the described mediums herein, further storing instructions for selecting one or more performance characteristics on which the plurality of construction compositions differ, the one or more performance characteristics not being specified as part of the job specification, and outputting a comparison of the plurality of construction compositions based on the selected performance characteristics.

The invention further includes any of the described mediums herein, further storing instructions for: receiving a notification that the set of inputs is changed; and reoptimizing the determined construction composition based on the notification.

The invention further includes any of the described mediums herein, wherein the changed input comprises a different set of available raw materials and components than were available when the construction composition was first determined.

The invention further includes a computer-implemented method comprising: receive a job specification for a construction composition, the job specification specifying one or more characteristics for the construction composition; accessing a set of variables affecting one or more properties of the construction composition, each of the variables associated with one or more corresponding characteristics that are affected by a change in the respective variable; providing the job specification and set of variables to an artificial intelligence; determining an initial construction composition using initial values for the set of variables, the initial construction composition associated with an initial set of characteristics; applying the artificial intelligence to adjust one or more of the variables in the initial construction composition, the adjusting causing the corresponding characteristics associated with the one or more variables to change; adjusting the initial set of characteristics based on the adjusted variables; determine at least one construction composition that meets or approximates the characteristics specified in the job specification based on the adjusted variables, wherein the construction composition comprises a list of ingredients; and outputting the at least one determined construction composition.

The invention further includes any of the described methods herein, further comprising repeating the applying and the adjusting: for a predetermined number of iterations, for a predetermined period of time, or until the characteristics of the determined construction composition is within a predetermined threshold margin of the job specification.

The invention further includes any of the described methods herein, wherein the set of variables comprise one or more of construction mixture proportions or construction admixtures for the construction composition or raw material behavior of the construction composition.

The invention further includes any of the described methods herein, wherein the set of variables comprise environmental conditions.

The invention further includes any of the described methods herein, wherein the characteristics comprise one or more of slump, stickiness, bleed, slump loss, strength deviation, and volume change of the manufacturing blend.

The invention further includes an apparatus comprising: a non-transitory computer-readable storage medium storing logic for a machine learning algorithm configured to select a combination of construction mixtures and admixtures; a hardware interface configured to receive training data, the training data comprising a predefined construction composition and associated performance characteristics for the predefined construction composition; and a hardware processor circuit configured to: train the machine learning algorithm based on the training data; receive, via the interface, one or more performance requirements for a new construction composition, and use the machine learning algorithm to select the new construction composition based on the received performance requirements, wherein the new construction composition is output using the interface.

The invention further includes any of the described apparatus herein, wherein the machine learning algorithm is configured to prioritize a performance factor over a cost factor.

The invention further includes any of the described apparatus herein, wherein the processor is further configured to: receive a report of a performance of the new construction composition; and retrain the machine learning algorithm based on the performance of the new construction composition.

The invention further includes any of the described apparatus herein, wherein the performance requirements comprise one or more of a fresh property of the construction composition, a hardened property of the construction composition, a strength of the construction composition, a surface appearance of the construction composition, a cost of the construction composition, or a durability of the construction composition.

The invention further includes any of the described apparatus herein, wherein the construction composition specifies one or more of available raw materials, construction processes to be employed with the construction composition, project specification information, and available construction admixtures.

DETAILED DESCRIPTION OF EXAMPLE EMBODIMENTS

As described above, it can be difficult to formulate a construction composition to meet all the various requirements of an engineering project while accounting for other variables that may affect the availability or performance of the construction composition ingredients. The development of an optimal set of construction composition raw material proportions for a given project requires a high level of familiarity with the properties of the material being designed, translating project needs and details into a set of preferred characteristics, and familiarity with locally-available raw materials.

Conventionally, one solution has been to develop a small number of construction mixtures having known performance ranges, and selecting from among the limited number of options available. This approach, however, has a number of limitations. First, the construction mixture may not be optimally formulated for the conditions that will be present at the job site. Second, the construction mixture raw materials used in the original formulation may not be available to a particular producer, which would either require the producer to use a different construction mixture or to change the construction mixture, yielding unknown or unpredictable results. Third, because producers can select from only a limited number of options to meet all of their engineering requirements, these formulations may be designed to exceed a wide variety of requirements, some of which may not apply to a particular project; this leads to the "over-optimization" problem discussed above.

Another possibility is to initiate an extensive process of experimentation, creating a number of construction mixtures, deploying them at conditions similar to those that will be encountered at the intended job site, allowing them to cure, and measuring their characteristics. This tends to be prohibitive in terms of time and costs. Moreover, the expertise required to develop and evaluate such a program may not be available at every production facility. Still further, such a procedure would not account for changing conditions or performance validation as the mixture is deployed throughout the actual project.

With either option, it is difficult or impossible to achieve an optimal construction mixture, since all possible construction mixtures cannot possibly be produced and experimented upon. Furthermore, these procedures tend to focus on the performance of the construction composition, without accounting for the cost of the construction composition.

Exemplary embodiments address these and other problems by providing techniques for formulating and evaluating a construction composition (such as a mixture for concrete, asphalt, mortar, etc.). According to exemplary embodiments, a predictive model artificial intelligence, machine learning algorithm, etc., may be trained using historical performance data (which may be supplemented with recent data and performance evaluations for construction compositions currently being deployed).

Once the model, AI, or algorithm is trained, a data structure representing a job specification may be received. The structure may include various requirements for the construction composition, which may optionally be prioritized. Moreover, a set of available inputs (e.g., raw materials, mixing techniques, etc.) may be accessed. These inputs may be provided to the model, AI, or algorithm, which may output one or more construction compositions that meet or best approximate the requirements. The output may specify a list of raw materials making up the construction composition, amounts or ratios of the construction composition raw materials, and any mixing techniques used to mix the raw materials to create the construction composition.

As part of, or separately from the model, AI, or algorithm, the construction compositions may be provided to a simulation to estimate or predict their performance (at the time of deployment, and/or over time thereafter).

Based on the output of the AI, model, or algorithm, (and potentially supplemented by simulation data), the performance characteristics of the output construction composition(s) may be displayed. In some embodiments, only those characteristics that differ from composition to composition may be displayed. In some embodiments, parameters that are not specified by the original job specification but which differ between the formulations may be displayed. In addition to performance, the cost of the construction composition may also be estimated. In some embodiments, the construction compositions may be ranked by performance, cost, or a weighted combination of performance and cost (among other possibilities)

A user may select one of the construction compositions for use in a project. In some embodiments, an optimal construction composition may automatically be selected (based on weighted combinations of performance and/or cost). Optionally, the system may control mixing machinery to produce the construction composition and/or constituent construction mixtures and/or construction admixtures (e.g., by transmitting instructions configured to cause the mixing machinery to acquire and mix raw materials specified in the output in amounts or ratios specified by the output).

In some embodiments, the AI/model/ML algorithm and/or simulations may be deployed to evaluate a proposed construction composition (rather than proposing its own construction composition). The characteristics or estimated performance of the proposed construction composition may be displayed and, if it is judged acceptable, the system may control mixing machinery to produce the construction composition (and/or a construction mixture and/or construction admixture).

These embodiments provide a number of advantages over the proposed conventional solutions described above.

First, the exemplary system significantly reduces or eliminates the number of experiments that need to be run on a given mixture or set of construction compositions, since the AI/model/algorithm can eliminate construction compositions that are unlikely to meet the job requirements; moreover, the use of simulations substitute for or supplement experiments.

Second, exemplary embodiments are better able to arrive at a set of optimized construction mixture proportions, since many more variables can be taken into account in the process of designing the construction composition. Furthermore, different parameters can be weighed against each other so that improved combinations or synergies can be identified. Because cost may be considered as a factor, the resulting solution may be less expensive and less prone to over-engineering.

Third, exemplary embodiments can rapidly optimize the construction compositions around multiple different performance desires. The effects on a change in the construction composition can be immediately evaluated across multiple different performance variables; evaluating these tradeoffs in a traditional scenario would typically require multiple experiments over a significant period of time.

Fourth, existing construction compositions can be re-optimized quickly based on changing conditions (e.g., different available construction mixtures and/or raw materials, changing conditions at the job site or en route to the job site, etc.). This allows for improved quality control and more consistent product as compared to traditional methods.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. The description of embodiments should facilitate understanding of the invention to such an extent that other implementations, not specifically covered but within the knowledge of a person of skill in the art having read the description of embodiments, would be understood to be consistent with an application of the invention.

It is noted that, although exemplary embodiments are described in connection with particular examples (e.g. construction compositions, and particularly concrete mixture and admixture production), the present invention is not limited to these examples.

FIG. 1 illustrates a construction composition environment 100 according to an example embodiment.

At a high level, the construction composition production process starts with a group of engineers, architects, technical experts, etc. 102. The experts 102 set the required parameters for the mixture in the form of technical requirements 104. For instance, in the case of concrete, the architect may require certain aesthetic properties for the finished concrete (color, texture, etc.) The engineers may evaluate the structural plans, applicable building codes, etc., and specify requirements in terms of strength, durability, stability, etc. Technical experts (e.g., specialists in deploying concrete) may specify required properties relating to the behavior of the construction composition as it is being deployed, such as workability, setting time, and viscosity.

The technical requirements 104 may be implemented at a construction composition plant 108. The construction composition plant 108 may include raw material silos 110 which store raw materials that may be combined to form the construction composition. Examples of raw materials include cement, coarse and fine aggregate, and supplementary cementing materials (SCM). Raw materials may also include water.

In some embodiments, the construction mixture used in the construction composition may be supplemented by an additional materials. For instance, concrete (an example of a construction composition 118) is generally formed of a primary general construction mixture 114 and a construction admixture 116 that changes various properties of the finished concrete. Construction admixtures 116 may include, for instance, dispersants, set modifiers (e.g., retarders and accelerators), air controllers (e.g., air entrainers and detrainers), strength modifiers, workability retention modifiers, and rheology modifiers. These raw materials may also be present in the raw material silos 110, individually or in combination.

The raw materials from the silos 110 may be mixed in a mixing facility 112. The mixing facility 112 may include mixing machinery controllable by a computer controller, and may produce the construction mixture 114, the construction admixture 116, and/or the finished construction composition 118.

Once mixed, the finished construction composition 118 may be loaded into a transport 126, such as a concrete truck. The transport 126 may carry the construction composition 118 via a route 128 to a job site 130 where the construction composition 118 will be deployed. Different construction composition plants 108 will necessarily need to use different routes 128 to the job site 130. Moreover, different transports 126 may take different routes 128 from a single construction composition plant 108 to a single job site 130.

The job site 130 may be overseen by a contractor 132. The contractor 132 may be responsible for ensuring that each batch of construction composition 118 delivered from each construction composition plant 108 is of consistent quality and meets the job's requirements. If the contractor 132 determines that a particular batch does not meet their standards or is deficient in some way, the contractor 132 may reject the batch and return it to the construction composition plant 108.

Exemplary embodiments improve the construction composition production process by deploying resources at locations throughout the environment 100.

For example, a producer server 106 may be provided at the construction composition plant 108. The producer server 106 may host optimization logic 122 for optimizing the construction mixture 114, construction admixture 116, and/or the final construction composition 118. The optimization logic 122 may be capable of selecting different available raw materials from the raw material silos 110 and defining their amounts or relative proportions, percentages, or ratios. The available raw materials may be represented in a components library 124, which may identify the raw materials and may include further information about the raw materials, such as the effect of the raw materials on performance parameters, any certifications that the components meet, the concentration of the raw materials, etc.

The optimization logic 122 may include an artificial intelligence, a machine learning algorithm (e.g., a neural network, a supervised learning process, an unsupervised learning process, a reinforcement learning process, etc.), a predictive model, etc. The optimization logic 122 may be trained using labeled training data, which may include historical or current data. The training data may identify the constituents of a construction mixture and measured properties of the mixture. Given sufficient training data, the optimization logic 122 may learn how various components can be mixed together to achieve target performance parameters.

In order to identify a construction mixture that meets the technical requirements 104, the producer server 106 may access a job specification 120, which may be a data structure that formalizes the technical requirements 104 and represents them in a way that the optimization logic 122 can process.

The optimization logic 122 may be applied at the front end, to identify an initial construction mixture 114 or construction admixture 116. The optimization logic 122 may also or alternatively be applied at the back end (after the construction composition 118 is produced) to modify the construction mixture 114 or construction admixture 116 in real time between successive batches of construction compositions. To this end, sensors may be deployed on the transport 126, along the route 128, or at the job site 130, among other possibilities. The sensors may generate sensor data 136, which may be provided to the producer server 106. The sensors may include, for example, accelerometers (e.g., for measuring how rugged the route 128 is), thermometers (for measuring ambient temperatures), barometers, hygrometers, etc. The sensor data 136 may be fed into the optimization logic 122, which may (for example) adjust materials to be used in the next batch of construction admixture 116 to be used. Similarly, the contractor 138 may manually input information about the job site 130 conditions or the delivered construction composition 118 (e.g., "too short a setting time," "too viscous," etc.). This information may also be provided via a contractor server 134 to the optimization logic 122, so that the construction mixture may be altered to account for the contractor's feedback.

Figure 2:
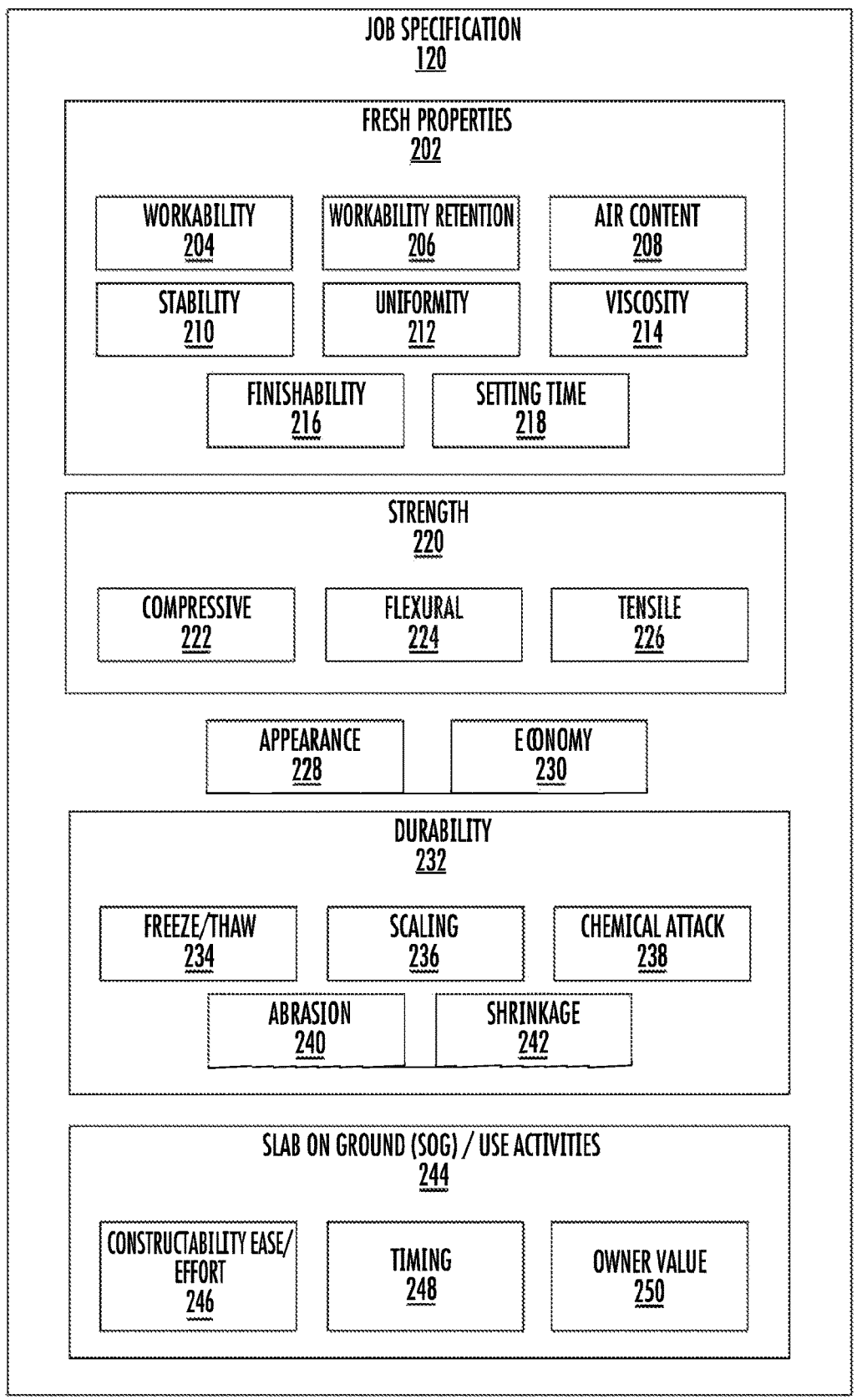
FIG. 2 depicts an exemplary data structure suitable for use as a job specification with exemplary embodiments.

FIG. 2 depicts an example of a data structure representing a job specification 120. Although the exemplary job specification 120 includes specific variables in a particular order, one of ordinary skill in the art will recognize that more, fewer, or different variables may be used, depending on the application. If a value is not specified for a variable, a default value may be used (e.g., a predefined minimum value, an average value, etc.). Values for the variables may be represented qualitatively, quantitatively, or both.

Values may be specified as a minimum or maximum value, a range of acceptable values, etc. The values may be associated with a weight or priority, indicating how important a particular performance characteristic is relative to other performance characteristics. The weight or priority may be zero, indicating that the performance characteristic is inconsequential or should not be prioritized.

The job specification 120 may specify parameters relating to the fresh properties 202 of the product. Fresh properties refer to the properties of a fresh (i.e., unhardened) product. Examples of fresh properties include workability 204, workability retention 206, air content 208, stability 210, uniformity 212, viscosity 214, finishability 216, and setting time 218.

The job specification 120 may further specify requirements for the strength 220 of the product. The strength of the product may be measured in a variety of ways, and separate parameters may be provided for (e.g.) compressive strength 222, flexural strength 224, and tensile strength 226.

The job specification 120 may specify quantitative or qualitative measures for the appearance 228 of the construction composition. The appearance 228 may specify features such as color or texture of the finished construction composition.

The job specification 120 may further specify a cost or economy parameter 230. The cost or economy 230 may be defined by the cost of the raw ingredients, and may optionally factor in transportation cost, deployment cost, mixing cost, or other costs affecting the value of the product.

The job specification 120 may specify durability characteristics 232. Examples of durability characteristics 232 include resistance to freeze or thaw 234, scaling 236, chemical attack 238, abrasion 240, or shrinkage 242.

The job specification 120 may further specify slab-on-ground properties and use activities 244. Examples of such activities may describe the ease or effort of constructability 246, timing 248 (such as amount of time for the product to cure or harden), and owner value 250. Further aspects of these activities are shown in FIG. 3B.

To assist the optimization logic 122, a mapping may be provided from requirements or performance characteristics to variables that affect those requirements or performance characteristics. The variables may include variables that can be directly affected by the producer (such as the amount of aggregate or water used, or the route used by the transports), as well as variables that are not in the direct control of the producer (such as ambient weather conditions or code requirements) but which nonetheless must be accounted for in determining the expected performance of a mixture. FIG. 3A depicts an exemplary mapping of modifiable parameters and sources of requirements to construction mixture properties that may be defined by the requirements or affected by adjustments to the parameters.

In some cases, performance requirements (such as finishability or resistance to cracking) may be indirectly affected by the components in the control of the producer. For instance, FIG. 3B depicts a mapping of exemplary desired performance parameters to corresponding properties of a construction composition. These properties may in turn be controlled by adjusting modifiable parameters of the construction composition, as shown in the mapping of FIG. 3C. Thus, the parameters of a mixture may be adjusted to directly or indirectly control various properties, and different hierarchies of mappings may be provided to account for the levels of control achieved (e.g., a first mapping may map the adjustable variables to a first set of properties, as in FIG. 3C, and a second mapping may map the first set of properties to a second set of properties, as shown in FIG. 3B; this process may be repeated to an arbitrary level).

Figure 4:
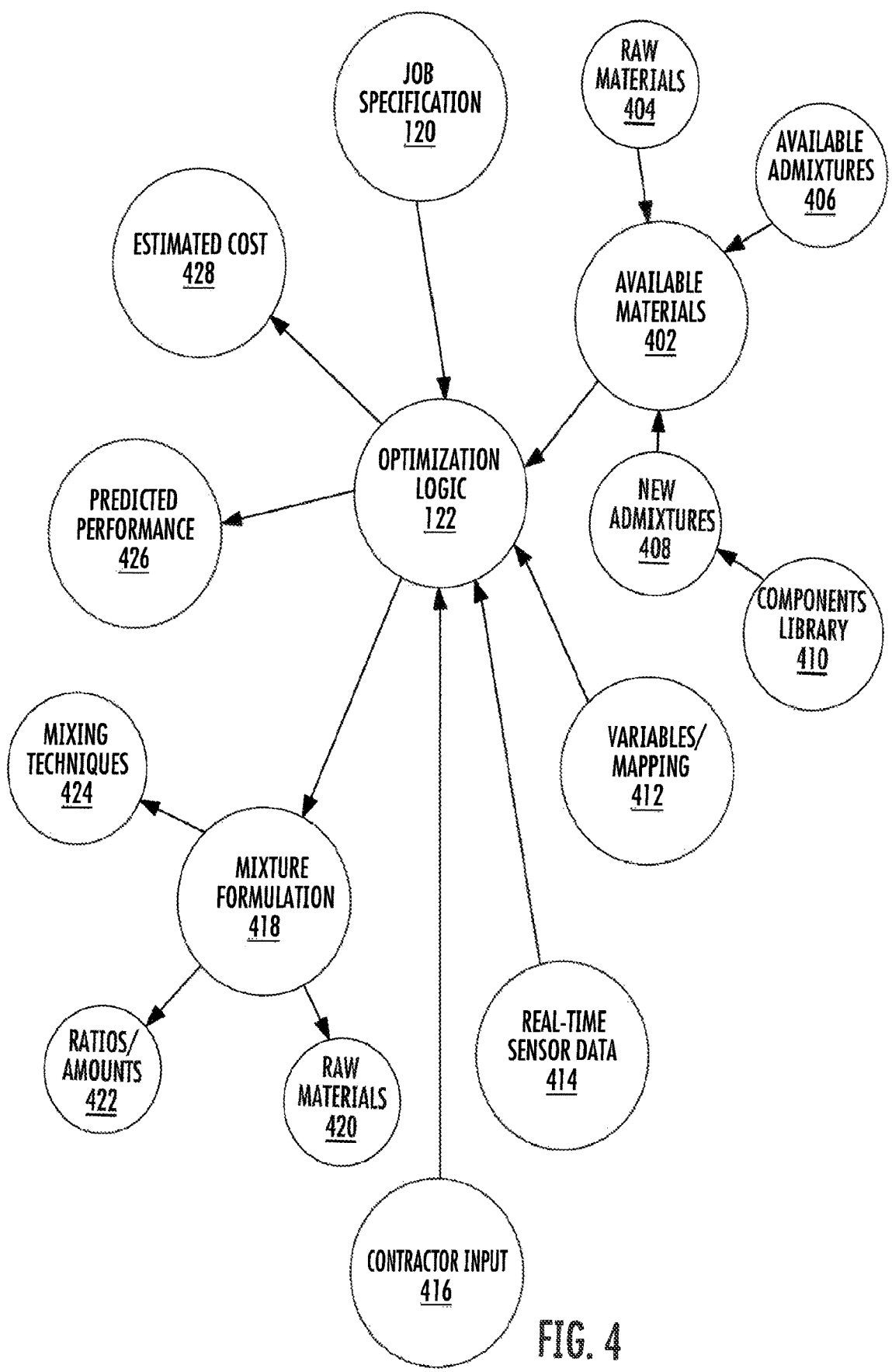
FIG. 4 is an exemplary input/output specification depicting inputs to the optimization logic, and corresponding outputs generated by the optimization logic.

FIG. 4 is an exemplary input/output specification depicting inputs to the optimization logic 122, and corresponding outputs generated by the optimization logic 122.

As previously discussed, the optimization logic 122 may consider the job specification 120. The optimization logic 122 may further consider the available materials 402 that can be used to create the finished construction composition (or a construction mixture, a construction admixture, or a combination of the construction mixture and construction admixture). The available materials 402 may include raw materials 404 (e.g. materials available in the raw materials silos), available pre-mixed construction admixtures 406, and/or construction admixtures 408 that can be newly created with available raw materials. The raw materials used to create the new construction admixtures 408 may be specified in a components library 410, which specifies the construction admixture components available for the construction admixture 408 and any properties of the finished product that may be affected by the inclusion of the construction admixture component. A similar components library 410 may be provided for the raw materials 404 used to make the initial construction mixture.

The optimization logic 122 may select from among the available materials 402 and/or may make adjustments to the materials in the construction mixture/admixture/composition on the basis of a mapping 412, such as the mappings depicted in FIGS. 3A-3C. The mappings may specify how the adjustment of one or more adjustable variables (e.g., an amount of an available material 402) affects a performance parameter (e.g., a parameter specified in the job specification 120).

The optimization logic 122 may consider real-time sensor data 414 and/or contractor input 416. The sensor data 414 and/or contractor input 416 may be taken as having an a priori effect on the performance parameters. In other words, the real-time sensor data 414 and contractor input 416 may specify values for variables that are taken as a given (and which may be un-adjustable), and the values for the available materials 402 may be optimized around the a priori data.

Based on the inputs to the optimization logic 122, the optimization logic 122 may output a construction mixture formulation 418. The construction mixture formulation may include an identifier for the raw materials 420 to be included in the formulation, ratios/amounts/percentages 422 for each raw material 420, and any applicable mixing techniques 424 or requirements. Based on this information, the optimization logic 122 may optionally generate instructions for mixing equipment so that the identified construction mixture can be automatically produced by the mixing equipment (and/or raw material manifests so that the ingredients can be manually obtained and then provided to the mixing equipment).

The optimization logic 122 may output a single construction mixture formulation 418 representing the formulation that best meets the requirements of the job specification 120 given the available raw materials 402, the real-time sensor data 414, and/or the contractor input 416. Alternatively, the optimization logic 122 may output multiple candidate construction mixture formulations 418 that balance the requirements in different ways.

In some embodiments, the construction mixture formulations may achieve similar results for different costs, which may be flagged in a display summarizing the various formulations. In some embodiments, the performance of the construction mixture may be prioritized over the cost of the construction mixture, so that the optimization logic 122 preferentially recommends construction mixtures that meet the performance requirements of the job specification 120 over construction mixtures that fail to meet these requirements but are less costly.

In some embodiments, performance requirements may be weighted to a higher degree than cost, so that a balance may be struck between performance and cost. For instance, a construction mixture may need to achieve a certain minimum level of cost savings before an acceptable amount of performance degradation is permitted.

The optimization logic 122 may output, for each of the identified construction mixture formulations 418, a predicted performance 426 of the construction mixture formulation. The predicted performance 426 may specify estimated values for the parameters specified in the job specification 120, or may include parameters not specified in the job specification (particularly if the different formulations 418 differ in terms of the unspecified parameters). The predicted performance 426 may be based on historical data and/or may be based on data obtained from virtual simulations of the determined construction mixture formulations 418.

The optimization logic 122 may further output an estimated cost 428 of each construction mixture formulation 418. The estimated cost 428 may be derived from the cost of the available materials 408, any special techniques employed to mix the materials, the cost of transport, and/or the cost for the contractor's team to deploy the construction mixture.

Figure 5:
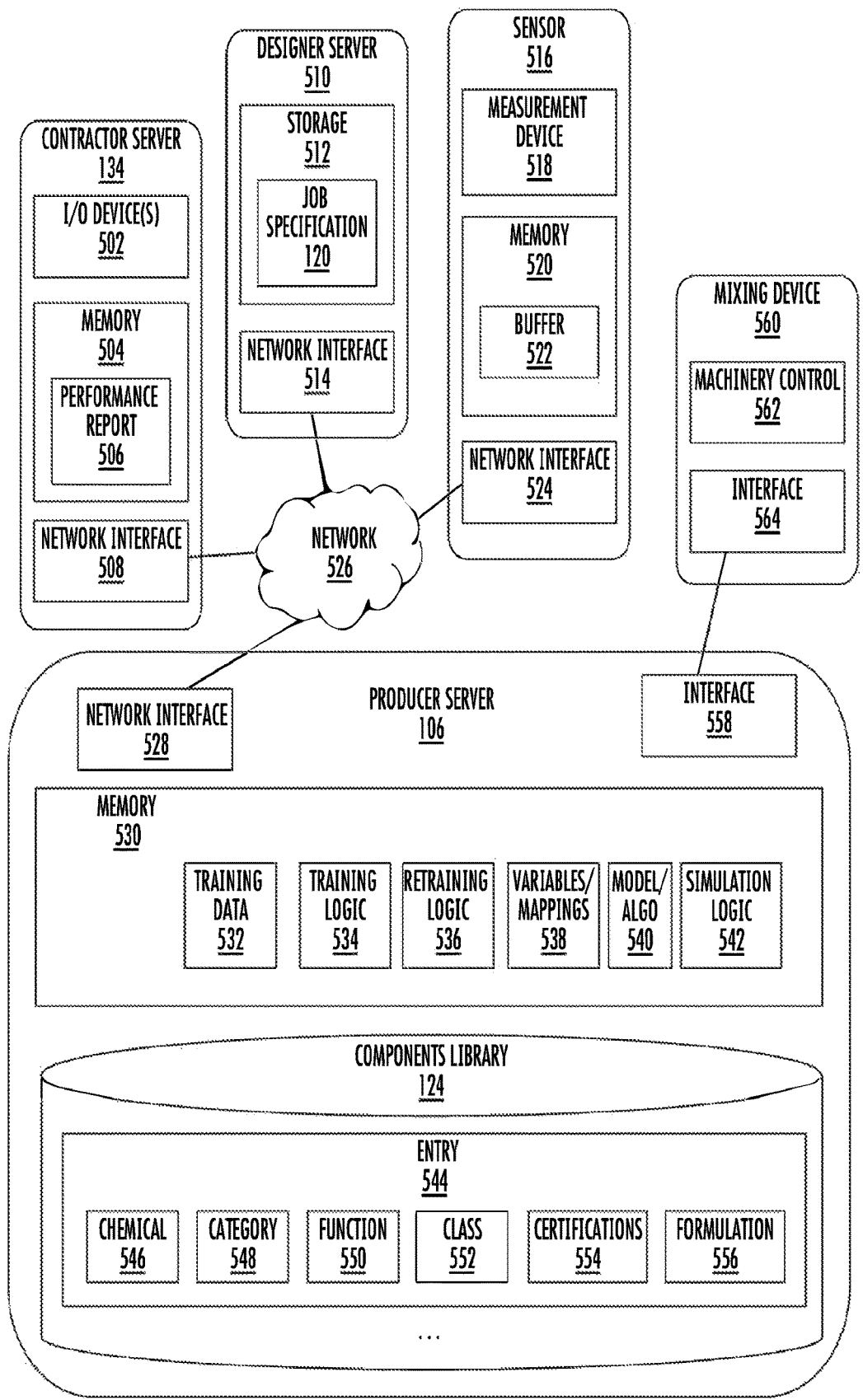
FIG. 5 is a block diagram depicting various hardware and digital components of devices in the environment of FIG. 1, according to an exemplary embodiment.

The optimization logic 122 may include various components, and may receive input from throughout the environment 100, as depicted in more detail in the block diagram of FIG. 5.

As previously noted, the construction mixture design process may begin with a team of architects, technical experts, or engineers. These users may access a designer server 510, which may include an application supporting a user interface allowing the users to enter the technical requirements into a job specification 120. The job specification 120 may be stored in a storage 512 (e.g., an HDD, a SSD, etc.) on the designer server 510. In some embodiments, the job specification 120 may be a special-purpose custom document designed in a special-purpose application. In others, the job specification 120 may be a formatted document, such as an XML document, a word processing document, or a spreadsheet, that identifies performance requirements using keywords or predetermined identifiers. In this case, the producer server 106 may parse the job specification 120 upon receipt in order to load the requirements into a data structure suitable for processing by the optimization logic 122.

The designer server 510 may transmit the job specification 120 to the producer server 106 using a network interface 514 (e.g., a wireless card, a wired connection, etc.). The job specification 120 may be transmitted over a network 526, such as a LAN, WAN, or the Internet.

The job specification 120 may be received by a corresponding network interface 528 on the producer server 106 and stored in a memory 530 of the producer server 106. The memory 530 may also hold the optimization logic 122, which may include a model or algorithm 540 configured to accept, as an input, the performance requirements of the job specification 120 and provide, as an output, one or more construction mixture specifications identifying construction mixtures that meet or best approximate the performance requirements. The model 540 may be, for example, a machine learning algorithm, an artificial neural network, a predictive model, a set of rules and corresponding triggered outputs, etc.

In this context, a data-driven model, preferably data-driven machine learning model or a merely data-driven model, refers to a trained mathematical model that is parametrized according to a training data set to reflect reaction kinetics or physico-chemical processes occurring during the mixing and use of the construction composition. An untrained mathematical model refers to a model that does not reflect reaction kinetics or physico-chemical processes, e.g. the untrained mathematical model is not derived from physical law providing a scientific generalization based upon empirical observation. Hence, the kinetic or physico-chemical properties may not be inherent to the untrained mathematical model. The untrained model does not reflect such properties. Feature engineering and training with respective training data sets enable parametrization of the untrained mathematical model. The result of such training is a merely data-driven model, preferably data-driven machine learning model, which as a result of the training process, preferably solely as a result of the training process, reflects reaction kinetics or physico-chemical properties.

The model 540 may be trained using historical training data 532. The training data 532 may include labeled training data which includes a previously-produced construction mixture and corresponding measured performance results pertaining to the construction mixture. The training data 532 may also include simulation data that estimates the performance parameters for a real or hypothetical construction mixture. The training data 532 may be obtained through experimentation, simulation, or by measurement of a deployed version of the construction mixture on a real-world job site, among other possibilities.

The model or algorithm 540 may be trained using the training data via training logic 534. The training logic 534 may be particular to the type of model or algorithm 540 being used. For example, if the model or algorithm 540 is a genetic algorithm, the training logic 534 may include a heuristic for selecting a most-suitable candidate in a generation and genetic operator for producing a next generation of candidates. If the model or algorithm 540 is a neural network, the training logic 534 may include a suitable propagation function. The training logic 534 may define initial weights and/or an initial structure for the training of the model or algorithm 540. Other examples of training logic 534 include clustering functions, logistic regression functions, time series parameters for a time series analysis, decision tree structures, etc.

The training data 532 may include all relevant performance parameters for a given construction mixture (e.g., those parameters shown in FIG. 2), or may include only a subset of such parameters. When only a subset of the parameters is included in a given entry in the training data 532, the training logic 534 may be configured to train only a certain portion of the model/algorithm 540 pertaining to the available data, or may be configured to extrapolate missing data from similar examples or simulations.

The training logic 532 may be configured to assign a weight or ranking to the various performance parameters. The weight or ranking may be predetermined (e.g., specified by engineers or experts), or may be assigned by the training logic 532 based on the training data 532. In some embodiments, the training logic 534 may consider the cost of the construction mixture as one of the performance parameters, but be configured to prioritize the performance of the mixture over the cost of the mixture.

The optimization logic 122 may also include retraining logic 536. In contrast to the training logic 534, which operates on historical training data 532, the retraining logic may be configured to adapt the model or algorithm 540 on-the-fly based on newly-received information (e.g., information from the sensors 516 or contractor server 134 that may not be reflected in the training data 532). The retraining logic 536 may be configured to adapt the model or algorithm 540 more slowly or conservatively than the initial training process, under the assumption that a properly-trained model should not change rapidly in view of limited data. The speed of adaptation may be adjustable so that a user may modify the extent to which new data is accounted for. The speed of adaptation may also be changed automatically in certain circumstances. For instance, if feedback is received from the contractor server 134 indicating that a batch of concrete that has been delivered is unacceptable or fails a certain performance parameter, then rapid adaptation is likely required and the model or algorithm 540 should be adjusted immediately.

The model or algorithm 540 may be built, in part, based on variables and mappings 538 which define how particular changes to a mixture are likely to affect performance parameters. Exemplary variables and mappings are depicted in FIGS. 3A-3C.

When determining which raw materials are available to be included in a given construction mixture or construction admixture, the optimization logic 122 may consult a components library 124. The components library 124 may be made up of a number of entries 544, each associated with a given chemical 546 or other material. In the case of a product made up of a construction mixture and construction admixture, separate components libraries 124 may be provided for the construction mixture and construction admixture.

A components library 124 may include a complete set of chemicals 546 that may be used to make the construction composition in question, or may include only a subset of such chemicals 546. The selection of a smaller, specific set of components can be tailored to those best suited for each application. Instead of an individual chemical 546 or other individual raw material, an entry 544 in the components library 124 may be a composition of several raw materials (maintaining known synergies for certain chemical combinations), or a finished product as it is known today. When a component is a single raw material, the selection of a particular raw material may be made to take advantage of a significant up-concentration in the locally-available raw material.

Basing the components on individual chemicals allows for amounts and ratios to be varied and customized for each application, material set, or condition such as high or low alkali cement or hot or cold temperatures. Component amounts and ratios can also be continuously adjusted on a sliding scale within a customer site as conditions or materials change.

Each chemical can be categorized by a category 548 representing fundamental performance attributes (e.g., "strength," "set modification," etc.) and a function 550 describing how that chemical affects the performance attribute (e.g., "increases strength" or "accelerates setting time"). Chemicals may further be separated into primary and secondary classes 552, where a primary class chemical has as its primary purpose (or main effect) modifying the function 550. A secondary class chemical may not be intended for performing the intended function 550 (e.g., it has a larger effect on some other function), but may do so as a side effect. Table 1 provides a list of exemplary attributes, functions, and classes that may be applied to various chemicals.

TABLE 1

| Category | Function | Class | Description & Additional Notes |
|---|---|---|---|
| Dispersant | Water reduction or increased workability | Primary | There are multiple dispersants to choose from where each has specific performance attributes. Based on the needs of a given mixture or conditions at a given location, pairs of dispersants can be selected to build the admixture composition. Ex: one general-purpose water-reducing & one High Early Strength dispersant might be a selected pair, or, a slump retaining general purpose water-reducing & a FWO dispersant might be another selected pair. |

TABLE 1-continued

| Category | Function | Class | Description & Additional Notes |
|---|---|---|---|
| Set Modification | Retarder Accelerator | Primary | Set modification refers to component additions to either increase or decrease setting time based on the needs of a given mixture or conditions at a given location. There are several potential candidates of each function from which to choose. |
| Air Control | Air-entrainer Air-detrainer | Primary | Air control refers to component additions to either increase or decrease mixture air content. Based on the needs of a given mixture or conditions at a given location, an air detrainer may be selected to control or limit air content to a maximum level. Alternatively, an air-entrainer may be selected to increase air content thereby providing desired freeze/thaw durability.. There are multiple chemistry and compositional choices for each function.; |
| Strength | Increased Strength | Secondary | Strength refers to component additions to further increase compressive strength beyond that obtained for a dispersant or dispersant & set modifier combination. The timing, i.e. age, of desired strength modification can be targeted by the selection of specific chemistries or compositions and there are multiple chemistry & compositional choices |
| Workability Retention | Increased workability retention | Secondary | Workability retention refers to component additions to further increase workability time beyond that obtained for a dispersant or dispersant & set modifier combination. |
| Rheology Modification | Increase or decrease viscosity or thixotropy | Secondary | Rheology modification refers to component additions to modify rheological parameters of the mixture such as plastic viscosity or thixotropy beyond that which is inherent for a given set of materials or obtained for a dispersant or dispersant & set modifier combination. There are multiple chemistry & compositional choices. |

Suitable examples of chemistry choices for each of the above categories are provided in Table 2, below. Other chemistry choices may also be used, and the categories are not limited to the examples provided below.

TABLE 2

| Category | Examples |
|---|---|
| Dispersant | Calcium lignosulfonate, sodium lignosulfonate, sulfonated melamine formaldehyde condensate (SMF), sulfonated naphthalene formaldehyde condensate (BNS), polycarboxylate dispersants with and without polyether sidechains, polyphosphates and mixtures thereof. |
| Regarders | Lignosulfonates, hydroxylated carboxylic acids, borax, gluconic, tartaric and other organic acids and their corresponding salts, phosphonates, certain carbohydrates such as sugars and sugar-acids and mixtures thereof. |
| Accelerators | A nitrate salt of an alkali metal, alkaline earth metal, or aluminum; a nitrite salt of an alkali metal, alkaline earth metal, or aluminum; a thiocyanate of an alkali metal, alkaline earth metal or aluminum; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (such as calcium formate); a halide salt of an alkali metal or alkaline earth metal (such as bromide), and mixtures thereof. |
| Air Entrainers | Wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. |

TABLE 2-continued

| Category | Examples |
|---|---|
| Air Detrainers | Tributyl phosphate, triisobutyl phosphate, dibutyl phthalate, octyl alcohol, water-insoluble esters of carbonic and boric acid, acetylenic diols, ethylene oxide-propylene oxide block copolymers and silicones. |
| Strength | Poly(hydroxyalkylated)polyethyleneamines, poly(hydroxyalkylated)polyethylenepolyamines, poly(hydroxyalkylated)polyethyleneimines, poly(hydroxyalkylated)polyamines, hydrazines, 1,2-diaminopropane, polyglycoldiamine, poly(hydroxyalkyl)amine, calcium silicate hydrate seed, treiethanolamine, tri-isopropanolamine, and mixtures thereof. |
| Workability Retention | Certain polycarboxylate dispersants, certain retarders, and mixtures thereof |
| Rheology Modification | Polyalkylene oxides, certain polysaccharides, cellulose polymers, polyacrylic acids, polyacrylamides, starch, modified starch, and mixtures thereof. |

Optionally, the entry 544 may identify any certifications 554 that the components would qualify for (e.g., C494 Certification). Moreover, the entry 544 may specify formulation details 556 (e.g., the concentration of the chemical 546 that is available or recommended, mixing recommendations, etc.).

The optimization logic 122 may further provide, for each identified construction mixture (or composition), a cost of the construction mixture, an estimated performance of the construction mixture, and a comparison between construction mixtures for specified or unspecified performance parameters. These items may be identified by simulating the performance of the construction mixture using simulation logic 542. The simulation logic 542 may build a model of the structure being designed by the architect/engineer/technical experts using the mixture formulations output by the optimization logic 122. The simulation logic 542 may, based on historical performance information for similar construction mixtures and/or mathematical models, evaluate the performance of the construction mixture for parameters specified in the job specification (and other parameters that may not be specified in the job specification but which may be pertinent to the performance of the mixture).

Based on the simulation, the simulation logic 542 may output and/or display a report comparing the different construction mixtures in terms of performance and cost. In some embodiments, only those performance parameters which differ between construction mixtures may be output or displayed. In some embodiments, the optimization logic 122 may evaluate and display a comparison based on performance parameters that differ between the construction mixtures but were not specified in the job specification 120. Accordingly, if the construction mixtures output by the optimization logic 122 appear to be similar in terms of the specified performance requirements and cost, these similar construction mixtures may be differentiated based on other factors that might not have otherwise been considered.

Once a particular construction mixture (or composition) formulation is determined or selected, the producer server 106 may control a mixing device 560 at the concrete plant to produce the construction mixture. For instance, the mixing device 560 may include a controller 562 capable of operating mixing machinery based on instructions. The controller 562 may control deployment of raw materials from the raw material silos, or may output a requested amount of raw material to be manually added to the mixing device 560. Once the raw materials are added to the mixing device 560, the controller 562 may activate a mixer for a specified amount of time (and potentially at a specified power or in a specified mixing pattern).

The producer server 106 may generate instructions for the controller 562 to carry out the above activities according to the formulation specified by the optimization logic 122. For instance, the controller 562 may expose an application programming interface (API) that allows the producer server 106 to call on functions of the controller 562 to carry out the activities. The producer server 106 may generate suitable instructions or function calls and transmit the instructions/calls to an interface 564 of the mixing device 560 via an interface 558 of the producer server. The interfaces 558, 564 may communicate directly via wired or wireless communication, and/or may communicate via a network.

As batches of the construction composition are made and shipped to a contractor, the producer server 106 may receive further feedback from sensors 516 and/or a contractor server 134. This information may allow the product to be modified or reformulated based on real-time feedback describing current conditions and/or the measured performance. For example, a contractor may generate a performance report 506 in a memory 504 of the contractor server 134. The performance report may specify quantitative measurements (e.g., output by sensors used by the contractor) and/or qualitative assessments from the contractor. The performance report 506 may be entered into the contractor server 134 via one or more input/output devices 502, such as a keyboard, microphone (for voice input), data port, etc. The performance report may be transmitted to the producer server 106 via a network interface 508.

Similarly, performance data and/or details about ambient conditions may be transmitted to the producer server from one or more deployed sensors 516. The sensors 516 may be deployed, for instance, on transport vehicles taking the mixture to the job site, at the job site itself, or on structures along the route from the plant to the job site.

The sensors 516 may include a measurement device 518, such as an accelerometer, anemometer, hygrometer, photometer, etc. Measurements from the measurement device may be transmitted directly to the producer server 106 via a network interface 524, or may be aggregated in a buffer 522 stored in the memory 520 of the sensor 516. After a predetermined amount of time, a predetermined number of readings, or when the memory 520 is filled to a certain level, the buffered data may be transmitted to the producer server 106.

Figure 6A:
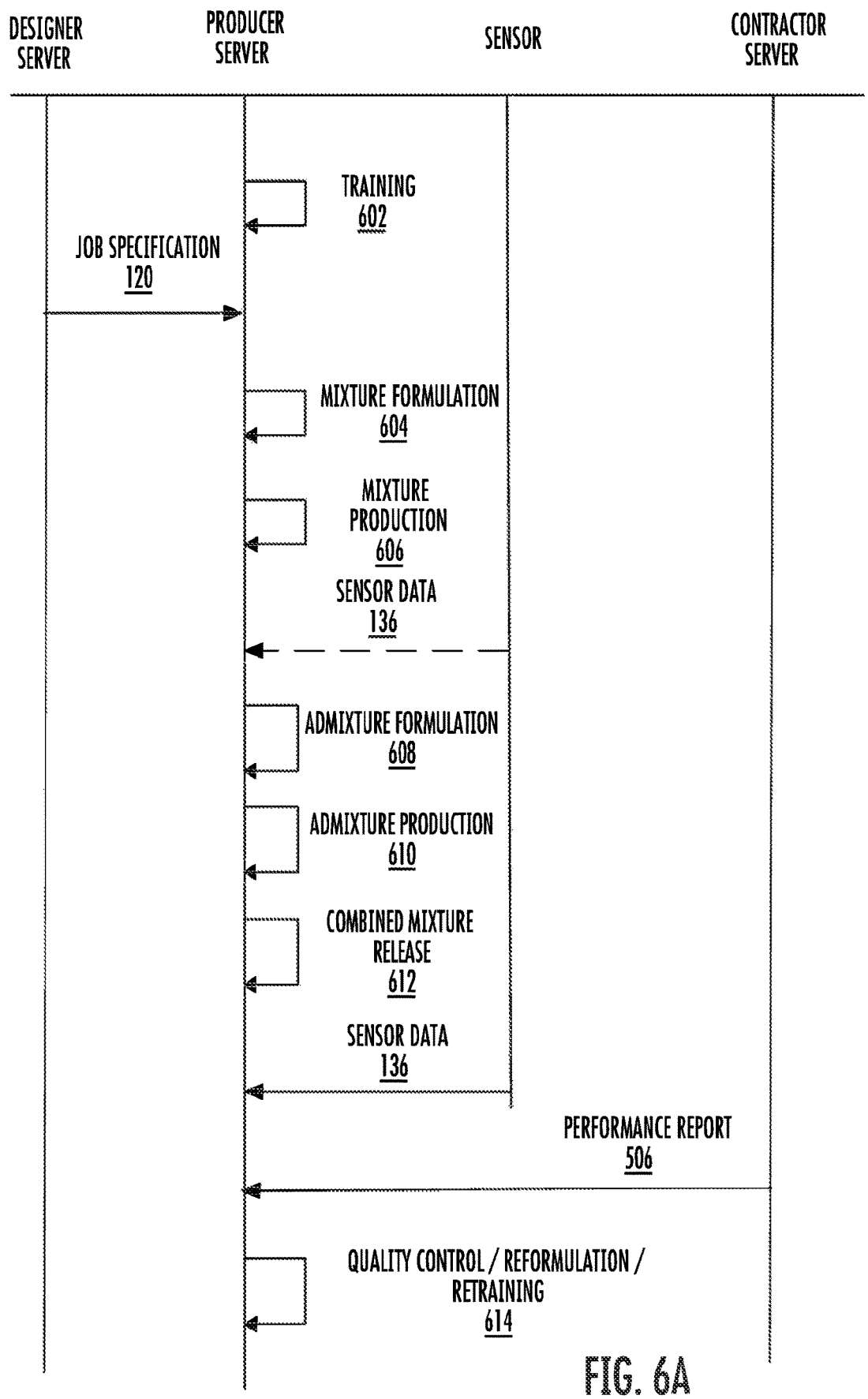
FIG. 6A is a data flow diagram describing exemplary exchanges of information between digital components of the environment.

The exchange of data between the designer server 510, the contractor server 134, the sensor 516, and the producer server 106 is described in more detail in the data flow diagram depicted in FIG. 6A.

Initially, the producer server may initiate a training process 602. The above-described training logic may consult historical data to build a model or algorithm for optimizing a formulation, given performance requirements in a job specification.

Next, a job specification 120 may be transmitted from the designer server to the producer server. In response to receiving the job specification 120, the producer server may initiate a mixture formulation process 604, which applies the model of algorithm to the received job specification 120 to generate one or more suitable mixtures that meet or best approximate the requirements of the job specification.

If multiple construction mixtures are generated, the system may output a comparison of the construction mixtures and allow one to be selected. Once a target construction mixture is identified, the producer server may initiate a construction mixture production process 606, which may involve generate instructions and/or controlling mixing machinery to produce the identified construction mixture.

In some cases, the construction mixture may be a general-purpose construction mixture whose properties are then modified by a construction admixture. During the construction admixture production process, sensor data 136 may optionally be read to identify ambient conditions that should be accounted for. Based on the sensor data 136 and the requirements of the job specification 120, the system may initiate a construction admixture formulation process 608 to create the construction admixture (in a similar manner to the construction mixture formulation process 604, although likely with different raw materials). The producer server may then initiate a construction admixture production process 610 to create the construction admixture (similar to the construction mixture production process 606). The construction admixture may be added directly to the construction mixture, or may be created separately and added to the construction mixture at a later time.

At 612, the producer server may release the combined construction composition to the job site. This may involve registering an identifier of the batch of the construction composition and causing the construction composition to be loaded onto a transport.

During or after delivery of the mixture, the producer server may receive input from the sensors and/or a performance report 506 from the contractor server. This data may provide real-time feedback that allows the producer server to update the construction composition formulation between batches, which may improve the consistency, performance, and/or cost of the construction mixture as a job is fulfilled. In response to this data, the producer server may perform a quality control, reformulation, or retraining process that updates the construction mixture and/or construction admixture created at 606, 610. The updated data may be provided to the optimization process, which may update the model or algorithm, or may alternatively re-apply an existing model or algorithm with new data provided by the sensors and/or contractor server.

Figure 6B:
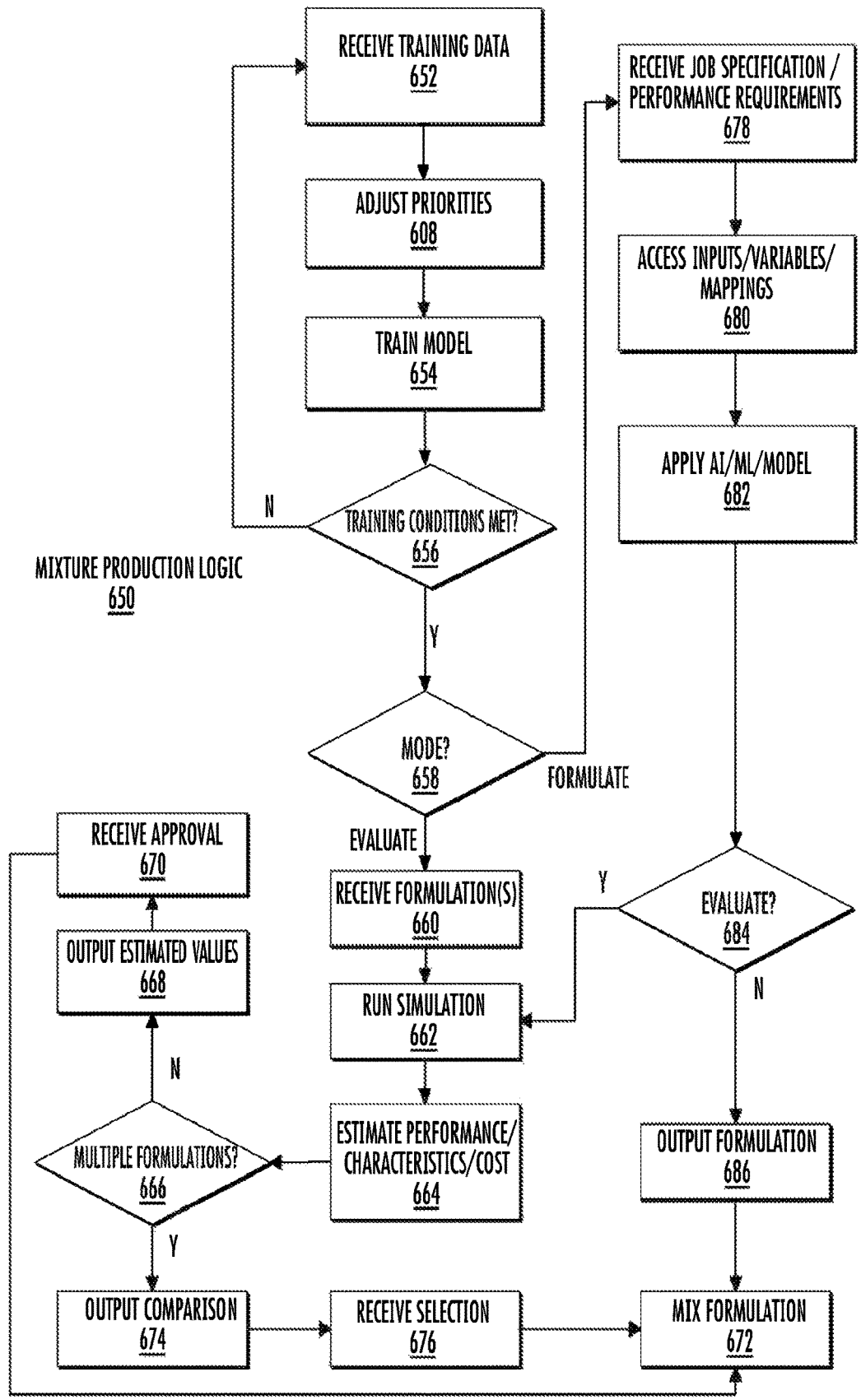
FIG. 6B is a flowchart illustrating key operations according to an example embodiment.

These actions are described in more detail in connection with the flowchart shown in FIG. 6B. The blocks of FIG. 6B may be implemented as logic 650 or instructions stored on a non-transitory computer-readable medium for execution at (e.g.) the producer server.

Processing may being at block 652, where the system receives training data. The training data may include historical data identifying a construction mixture formulation and associated performance results that were measured when the construction mixture formulation was deployed. Information about ambient conditions, location, etc. may also be provided as part of the historical data. The training data may also or alternatively include simulation data received as a result of a computer simulation performed on a hypothetical or actual construction mixture formulation.

The training data may be associated with various performance parameters. At block 608, priorities associated with those parameters may be set or adjusted by adjusting a weight of the parameters. For instance, the cost of a construction mixture may be de-prioritized as compared to performance parameters. A user may also specify relative performance of various parameters (e.g., strength and durability are more important than aesthetics).

Based on the training data and the specified priorities, the model or algorithm may be trained by training logic at block 654. Training may be performed until a set of training conditions are met. For example, a set of training data may be held in reserve to test the performance of the trained model or algorithm. The model or algorithm may be tested on the reserved training data to determine if the model or algorithm generates an appropriate mixture based on the performance characteristics (where the "appropriate" mixture would be considered to be a mixture within a threshold amount of difference from the mixture defined in the training data).

If, at block 656, the system determines that the model has been sufficiently trained, then processing may proceed to block 568. If not, processing may return to block 652 and the system may incorporate additional training data into the model or algorithm.

The system may be capable of operating in several different modes. In an "evaluate" mode, the system may accept, as input, one or more construction mixture formulations and conduct a performance evaluation of the formulation(s). In a "formulate" mode, the system accepts a set of requirements (e.g., a job specification) and generates a formulation for a construction mixture (or set of construction mixtures) that meets or approximates the requirements.

If the system is in formulate mode at block 568, processing may proceed to block 660 and the system may receive the formulation. The formulation may be input via an interface (e.g., by specifying amounts or proportions of identified raw materials), or may be received as a finished specification identified in a data structure. A single formulation may be received for evaluation, or multiple formulations may be received for evaluation and comparison.

At block 662, the system may run a simulation on the formulation(s) using the previously-described simulation logic. The output of the simulation may be a set of performance characteristics, cost parameters, etc, which are estimated at block 664.

At block 666, the system determines if multiple formulations were submitted for comparison. If not, then the system outputs (at block 668) the estimated values determined at block 664. This may involve storing the estimated values in a memory, transmitting the values on a network, and/or displaying the values on a display.

If the formulation was submitted for evaluation as part of a production process, then at block 670, the system may request approval to create the evaluated formulation. If approval is received at block 670, then processing proceeds to block 672 and the system instructs mixing equipment to create the formulation, as described previously.

Returning to block 666, if multiple formulations were evaluated, the system may output a comparison of the evaluations at block 674. The comparison may provide a side-by-side overview of each formulation and may highlight differences in various performance characteristics of the formulations. In some embodiments, all of the performance characteristics may be shown for comparison. In others, only the performance characteristics that differ between formulations may be shown or highlighted. Still further, performance characteristics that were not specified as part of the original evaluation request may be considered and displayed if they differ from each other. In some embodiments, unspecified performance characteristics may be considered only if the specified performance characteristics are the same or differ by less than a predetermined threshold amount (thus allowing relatively similar formulations to be differentiated on other grounds).

Based on the comparison, the system may receive a selection at block 676 of one of the formulations (from a user, or programmatically based on a weighting of the importance of various parameters). Processing may then proceed to block 672 and the system may mix the selected formulation as described above.

If, at block 658, the system is in "formulate" mode, then processing may proceed to block 678, where a job specification or set of performance requirements may be received. At block 680, the system may access a set of inputs, variables, or mappings that describe how available raw materials affect the parameters set forth in block 678 (this information may also or alternatively be incorporated into the model/AI/ML algorithm).

At block 682, the system may apply an artificial intelligence, machine learning algorithm, or model to generate a formulation based on the parameters received at block 678. The optimization logic may apply the algorithm or model to generate one or more output formulations as described above.

In some embodiments, the AI/ML/model may be capable of being applied on a continuous basis on until an express stopping command is received. In these embodiments, the optimization logic may continue to run over the AI/NIL/ model for a predetermined number of iterations, for a predetermined period of time, or until the characteristics of the determined manufacturing blend is within a predetermined threshold margin of the job specification. Other stopping conditions may also be applied.

After the stopping conditions have been met, processing may proceed to block 684, where the system determines whether to evaluate the formulation(s) that were generated at block 682. If so, processing may return to block 662, and the system may run simulations on the formulated product(s). If not, then processing may proceed to block 686, where the formulation(s) may be output (e.g., to a network, a memory, or a display). A formulation may be selected for use (or, in the case of a single formulation, may be approved), and processing may proceed to block 672 where the formulation may be sent for mixing.

Figure 7:
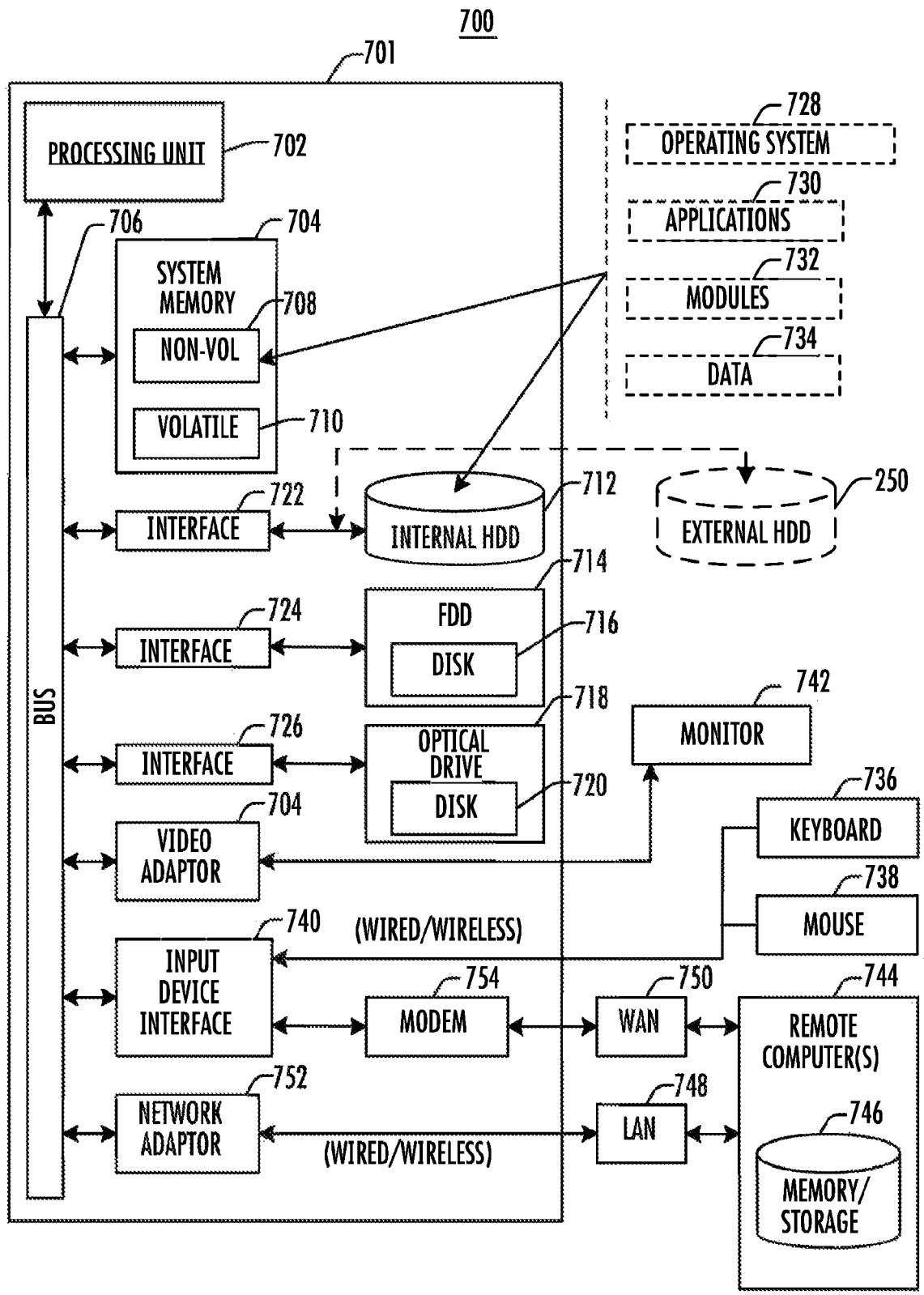
FIG. 7 depicts an exemplary computing system suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
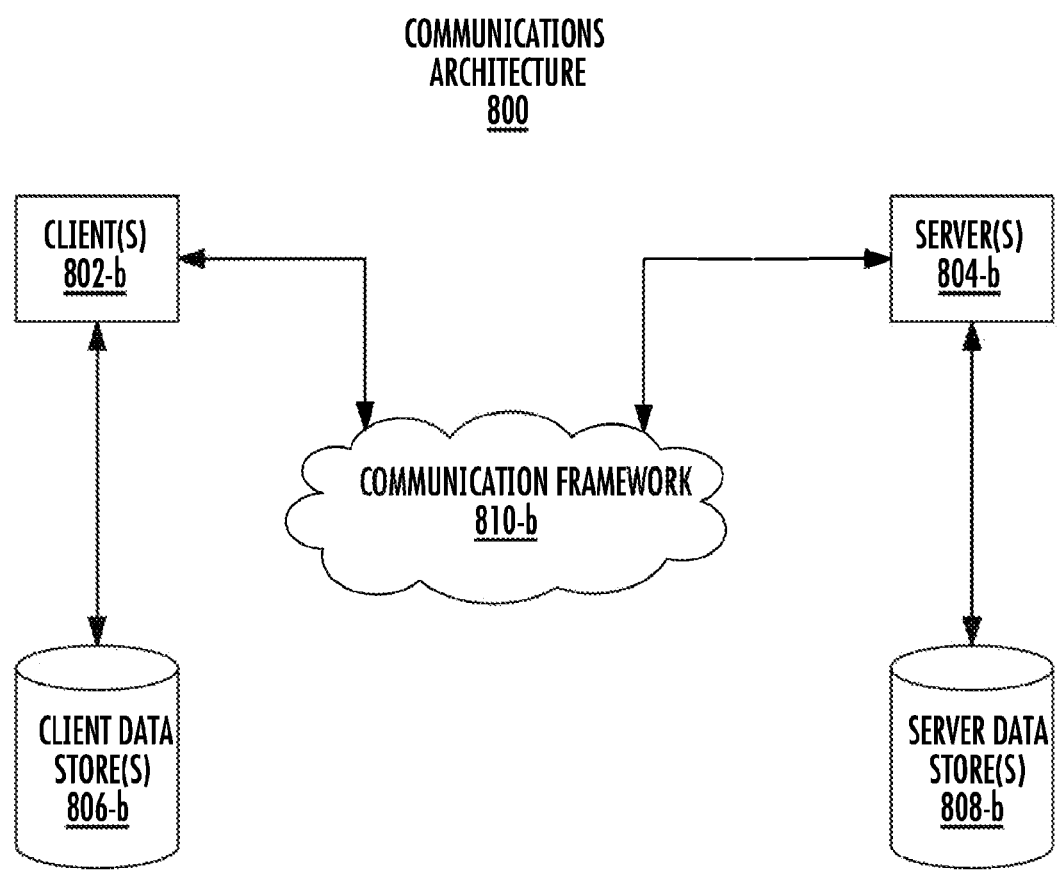
FIG. 8 depicts an exemplary network environment suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A non-transitory computer-readable medium storing instructions that, when executed by one or more processors, cause the one or more processors to:

receive a job specification for a construction composition to be used in a structure, the job specification specifying one or more performance requirements for the construction composition;

access a set of inputs affecting one or more properties of the construction composition;

provide the job specification and set of inputs to an artificial intelligence trained to map input construction compositions to associated performance characteristics;

programmatically determine, using the artificial intelligence, a plurality of construction compositions that meet or approximate the performance requirements of the job specification given the set of inputs, wherein:

each of the construction compositions comprises a plurality of raw materials mixed in a determined ratio, the plurality of raw materials comprise at least one of an aggregate, a dispersant, a set modifier, an air controller, a strength modifier, a cementing material, a workability retention modifier, or a rheology modifier, the plurality of construction compositions differ from each other in at least one of an amount or a type of the raw materials, and the artificial intelligence applies a mapping between the performance requirements and one or more variables, the variables comprising one or more producer-affectable variables and one or more ambient condition variables;

output, from the artificial intelligence, the plurality of construction compositions approximating the performance requirements of the job specification;

determine a predicted performance for each of the plurality of construction compositions output from the artificial intelligence, the determining comprising one or more of applying historical data or running a simulation on each of the plurality of compositions output by the artificial intelligence to predict an expected performance of each respective construction composition by building a logical model of the structure using the respective construction composition and applying simulation logic to evaluate a performance of the respective construction composition with respect to the performance requirements in the job specification, the predicted performance comprising estimated values for the parameters specified in the job specification;

output the predicted performance of each respective construction composition;

receive a selection of a selected construction composition from among the plurality of compositions simulated by the simulation logic;

generate instructions in real time configured to cause a controller associated with a mixing device to automatically produce the selected construction composition, and transmitting the instructions to the controller; and produce, using the mixing device under control of the controller, the construction composition by mixing the plurality of raw materials according to the instructions.

2. The medium of claim 1, further storing instructions for producing the determined construction composition.

3. The medium of claim 1, wherein the construction composition is selected from the group of an asphalt mixture, a concrete mixture, or a mortar mixture.

4. The medium of claim 1, wherein the job specification comprises one or more of a fresh property of the construction composition, a hardened property of the construction composition, a strength of the construction composition, a surface appearance of the construction composition, a cost of the construction mixture, or a durability of the construction mixture.

5. The medium of claim 1, further comprising receiving a priority for one or more of the performance requirements, and accounting for the priority.

6. The medium of claim 1, wherein the set of inputs comprise one or more of available raw materials, climatological data for a construction site, construction processes to be employed with the construction composition, project specification information, available construction admixtures, and information pertaining to travel from a mixing site to a construction site.

7. The medium of claim 1, further storing instructions for selecting one or more performance characteristics on which the plurality of construction compositions differ, the one or more performance characteristics not being specified as part of the job specification, and outputting a comparison of the plurality of construction compositions based on the selected performance characteristics.

8. The medium of claim 1, further storing instructions for:
receiving a notification that the set of inputs is changed; and
reoptimizing the determined construction composition based on the notification.

9. The medium of claim 8, wherein the changed input comprises a different set of available raw materials and components than were available when the construction composition was first determined.

10. The medium of claim 1, further storing instructions configured to cause the processor to:
receive a report of a performance of the new construction composition; and
retrain the artificial intelligence based on the performance of the new construction composition.

11. The medium of claim 1, further storing instructions configured to produce the selected construction composition, the producing comprising instructing mixing device to add the plurality of raw materials for the construction composition together in the determined ratio, and causing the construction composition.

12. The medium of claim 1, further comprising prioritizing a first construction composition over a second construction composition on a display when the predicted performance of the first construction composition exceeds the predicted performance of the second construction composition.

13. The medium of claim 1, further comprising estimating a cost for each of the plurality of construction compositions output from the artificial intelligence.

14. The medium of claim 13, further comprising prioritizing a first construction composition over a second construction composition on a display when a weighted performance of the first construction composition exceeds a weighted performance of the second construction composition, the weighted performances being configured to penalize a performance degradation unless a minimum level of cost savings is achieved.

15. A computer-implemented method comprising:
receiving a job specification for a construction composition to be used in a structure, the job specification specifying one or more characteristics for the construction composition;
accessing a set of variables affecting one or more properties of the construction composition, each of the variables associated with one or more corresponding characteristics that are affected by a change in the respective variable;
providing the job specification and set of variables to an artificial intelligence trained to map input construction compositions to associated performance characteristics;
determining an initial construction composition using initial values for the set of variables, the initial construction composition associated with an initial set of characteristics;
applying the artificial intelligence to adjust one or more of the variables in the initial construction composition, the adjusting causing the corresponding characteristics associated with the one or more variables to change;
adjusting the initial set of characteristics based on the adjusted variables;
determining, using the artificial intelligence, a plurality of construction compositions that meet or approximate the characteristics specified in the job specification based on the adjusted variables, wherein:
each of the construction compositions comprise a list of ingredients mixed in a predetermined ratio,
the list of ingredients comprise at least one of an aggregate, a dispersant, a set modifier, an air controller, a strength modifier, a workability retention modifier, or a rheology modifier,
the plurality of construction compositions differ from each other in at least one of an amount or a type of the ingredients, and
the artificial intelligence applies a mapping between the performance requirements and one or more variables, the variables comprising one or more producer-affectable variables and one or more ambient condition variables;
outputting, from the artificial intelligence, the plurality of construction compositions approximating the performance requirements of the job specification;
determine a predicted performance for each of the plurality of construction compositions output from the artificial intelligence, the determining comprising one or more of applying historical data or running a simulation on each of the plurality of compositions output by the artificial intelligence to predict an expected performance of each respective construction composition by building a logical model of the structure using the respective construction composition and applying simulation logic to evaluate a performance of the respective construction composition with respect to the performance requirements in the job specification, the predicted performance comprising estimated values for the parameters specified in the job specification;

outputting the predicted performance of each respective construction composition;

receiving a selection of a selected construction composition from among the plurality of compositions simulated by the simulation logic; and generating instructions in real time configured to cause a controller associated with a mixing device to automatically produce the selected construction composition, and transmitting the instructions to the controller; and producing, using the mixing device under control of the controller, the construction composition by mixing the plurality of raw materials according to the instructions.

16. The method of claim 15, further comprising repeating the applying and the adjusting:

for a predetermined number of iterations, for a predetermined period of time, or until the characteristics of the determined construction composition is within a predetermined threshold margin of the job specification.

17. The method of claim 15, wherein the set of variables comprise one or more of construction mixture proportions or construction admixtures for the construction composition or raw material behavior of the construction composition.

18. The method of claim 15, wherein the set of variables comprise environmental conditions.

19. The method of claim 15, wherein the characteristics comprise one or more of slump, stickiness, bleed, slump loss, strength deviation, and volume change of the manufacturing blend.

20. The method of claim 15, further comprising:

receiving a report of a performance of the new construction composition; and retraining the artificial intelligence based on the performance of the new construction composition.

21. An apparatus comprising:

a non-transitory computer-readable storage medium storing logic for an artificial intelligence configured to select a combination of construction mixtures and admixtures, the artificial intelligence trained to map input construction compositions to associated performance characteristics;

a hardware interface configured to receive and transmit data; and a hardware processor circuit configured to:

receive, via the interface, one or more performance requirements for a new construction composition;

use the artificial intelligence to select the new construction composition based on the received performance requirements, the selecting comprising:

programmatically determining, using the artificial intelligence, a plurality of construction compositions that meet or approximate the performance requirements of the job specification given the set of inputs, wherein:

each of the construction compositions comprises a plurality of raw materials mixed in a determined ratio, the plurality of raw materials comprise at least one of an aggregate, a dispersant, a set modifier, an air controller, a strength modifier, a workability retention modifier, or a rheology modifier, the plurality of construction compositions differ from each other in at least one of an amount or a type of the raw materials, and the artificial intelligence applies a mapping between the performance requirements and one or more variables, the variables comprising one or more producer-affectable variables and one or more ambient condition variables output the plurality of construction compositions approximating the performance requirements of the job specification;

determine a predicted performance for each of the plurality of construction compositions output from the artificial intelligence, the determining comprising one or more of applying historical data or running a simulation on each of the plurality of compositions output by the artificial intelligence to predict an expected performance of each respective construction composition by building a logical model of the structure using the respective construction composition and applying simulation logic to evaluate a performance of the respective construction composition with respect to the performance requirements in the job specification, the predicted performance comprising estimated values for the parameters specified in the job specification, wherein the predicted performance of each respective construction composition is output using the interface;

receive a selection of a selected construction composition from among the plurality of compositions simulated by the simulation logic;

generate instructions in real time configured to a controller associated with a cause mixing device to automatically produce the selected construction composition, and transmitting the instructions to the controller; and produce, using the mixing device under control of the controller, the construction composition by mixing the plurality of raw materials according to the instructions.

22. The apparatus of claim 21, wherein the artificial intelligence is configured to prioritize a performance factor over a cost factor.

23. The apparatus of claim 21, wherein the processor is further configured to:

receive a report of a performance of the new construction composition; and retrain the artificial intelligence based on the performance of the new construction composition.

24. The apparatus of claim 21, wherein the performance requirements comprise one or more of a fresh property of the construction composition, a hardened property of the construction composition, a strength of the construction composition, a surface appearance of the construction composition, a cost of the construction composition, or a durability of the construction composition.

25. The apparatus of claim 21, wherein the construction composition specifies one or more of available raw materials, construction processes to be employed with the construction composition, project specification information, and available construction admixtures.

* * * * *